(12) United States Patent
Bardini et al.

(10) Patent No.: US 11,455,550 B2
(45) Date of Patent: Sep. 27, 2022

(54) SYSTEM AND METHOD FOR DETECTING AND FORECASTING THE BEHAVIOR OF A SYSTEM

(71) Applicant: SIEMENS AKTIENGESELLSCHAFT, Munich (DE)

(72) Inventors: Matteo Bardini, Genoa (IT); Francesco Volpi, Genua (IT); Alessio Dellacha, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 920 days.

(21) Appl. No.: 16/253,293

(22) Filed: Jan. 22, 2019

(65) Prior Publication Data

US 2019/0228324 A1  Jul. 25, 2019

(30) Foreign Application Priority Data

Jan. 19, 2018  (EP) .................................... 18152453

(51) Int. Cl.
*G06N 5/04* (2006.01)
*G06Q 10/00* (2012.01)
(Continued)

(52) U.S. Cl.
CPC ........... *G06N 5/04* (2013.01); *G06F 11/3013* (2013.01); *G06F 11/3419* (2013.01);
(Continued)

(58) Field of Classification Search
CPC . G06F 11/3013; G06F 11/3419; G06N 5/045; G06N 20/10
See application file for complete search history.

(56) References Cited

U.S. PATENT DOCUMENTS 8,302,079 B2 * 10/2012 Bansal ................ G06F 11/3419
717/127
8,887,009 B1 * 11/2014 Harrison ............. G06F 11/3409
714/47.3
(Continued)

FOREIGN PATENT DOCUMENTS

CN    106933204 B  *  7/2021  ............. G05B 17/02
WO    2016144586 A1     9/2016

OTHER PUBLICATIONS

Koh et al., "An Analysis of Performance Interference Effects in Virtual Environments", 2007, IEEE (Year: 2007).*
(Continued)

*Primary Examiner* — Wei Y Zhen
*Assistant Examiner* — Junchun Wu
(74) *Attorney, Agent, or Firm* — Laurence A. Greenberg; Werner H. Stemer; Ralph E. Locher (57) ABSTRACT

A system and method detect and forecast a performance degradation of a M-system. The method includes collecting data regarding the M-System during a period of time P1, storing the collected data in a database and analyzing the collected data collected during the period of time P1 by an elaboration routine containing two distinct elaboration phases. Namely, a first elaboration phase, where a performance analysis system selects among the collected data a set of data to be analyzed and removes any noisy data from the set of data and a second elaboration phase, where the performance analysis system correlates, for the set of data, data belonging to different sources, but generated at a same time within the period of time P1 to create M-System state data snapshots characterizing the M-System at different times Ti within the period of time P1. Finally, a model for the M-System is generated from input datasets.

11 Claims, 4 Drawing Sheets

(51) Int. Cl.
| | |
|---|---|
| G06Q 10/04 | (2012.01) |
| G06Q 10/06 | (2012.01) |
| G06N 20/10 | (2019.01) |
| G06N 20/00 | (2019.01) |
| G06F 11/30 | (2006.01) |
| G06F 11/34 | (2006.01) |

(52) U.S. Cl.
CPC ............ *G06N 5/045* (2013.01); *G06N 20/00* (2019.01); *G06N 20/10* (2019.01); *G06Q 10/04* (2013.01); *G06Q 10/06393* (2013.01); *G06Q 10/20* (2013.01)

(56) References Cited

U.S. PATENT DOCUMENTS

| | | | | |
|---|---|---|---|---|
| 9,904,587 | B1* | 2/2018 | Potlapally | G06F 11/3419 |
| 9,926,852 | B2* | 3/2018 | Tiwari | G06Q 10/04 |
| 9,960,598 | B2* | 5/2018 | Asati | H02J 13/00 |
| 10,613,525 | B1* | 4/2020 | Kapoor | G06F 11/3476 |
| 10,901,038 | B2* | 1/2021 | Kong | H01M 8/04679 |
| 11,334,834 | B2* | 5/2022 | Ghosh | G06F 16/489 |
| 2005/0133211 | A1* | 6/2005 | Osborn | F28F 19/00 |
| | | | | 165/157 |
| 2009/0204234 | A1 | 8/2009 | Sustaeta et al. | |
| 2009/0312956 | A1* | 12/2009 | Zombo | F01D 5/288 |
| | | | | 374/57 |
| 2010/0042366 | A1* | 2/2010 | Colclough | G06F 11/3013 |
| | | | | 702/182 |
| 2015/0262095 | A1 | 9/2015 | Rajasekaran et al. | |
| 2016/0078362 | A1* | 3/2016 | Christodorescu | G06N 20/10 |
| | | | | 706/12 |
| 2018/0046149 | A1 | 2/2018 | Ahmed | |
| 2018/0150342 | A1* | 5/2018 | Shridhar | G06F 11/3495 |
| 2018/0373234 | A1* | 12/2018 | Khalate | G06N 7/005 |
| 2019/0129403 | A1* | 5/2019 | Turney | G05B 23/0294 |
| 2020/0257992 | A1* | 8/2020 | Achin | G06N 20/10 |

OTHER PUBLICATIONS

Grottke et al., "Analysis of Software Aging in a Web Server", Sep. 2006, IEEE, vol. 55, No. 3 (Year: 2006).*

Mi et al., "Burstiness in Multi-tier Applications: Symptoms, Causes, and New Models", IFIP, 2008, pp. 265-286 (Year: 2008).*

Wen et al., "Causal Interactions in Attention Networks Predict Behavioral Performance", The Journal of Neuroscience, 2012 (Year: 2012).*

Huang et al., "Reliability analysis of electronic devices with multiple competing failure modes involving performance aging degradation", Feb. 2003, John Wiley & Sons, Ltd. (Year: 2003).*

* cited by examiner

SYSTEM AND METHOD FOR DETECTING AND FORECASTING THE BEHAVIOR OF A SYSTEM

CROSS-REFERENCE TO RELATED APPLICATION

This application claims the priority, under 35 U.S.C. § 119, of European Patent Application EP 18152453.9, filed Jan. 19, 2018; the prior application is herewith incorporated by reference in its entirety.

BACKGROUND OF THE INVENTION

FIELD OF THE INVENTION

The invention relates to a method and system for automatically detecting and forecasting the behavior of a system, typically its performance degradation, notably in the context of a manufacturing execution system (MES). Most recently, the phrase manufacturing operation management (MOM) is more and more used to replace the term MES.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens Corporation offers a broad range of MES/MOM products under its SIMATIC IT® product family.

A common problem of all large systems is the performance degradation and internal problem detection. System internal errors, problems, degradations may even lead to the system downtime which may have very negative consequences for instance regarding the achievement of specific production rates. In order to avoid such negative consequences, the solution is to analyze system data in a fast way in order to quickly intervene and reduce to the minimum the system downtime.

In MES products, this is a common issue for two main reasons: The first reason is related to the fast variation of the data with time. Indeed, with a typical variation in the order of the seconds, it becomes very difficult for a human operator to properly address on time the issue and solve it. The second reason is related to the evolution of system technologies, wherein plant/system automation focuses more and more on a fully automatic procedure free of any direct involvement of a human operator for solving plant/system issues.

Most of the time, a simple problem detection is not enough for avoiding negative impacts for the working of a system, because usually, when the problem is detected, the system is already in a state for which no automatic procedure can mitigate the problem, letting as single solution a human intervention for solving said problem.

SUMMARY OF THE INVENTION

An objective of the present invention is therefore to provide a method and a system for detecting and forecasting system performance degradation in real time within the context of a MES in order to avoid the previously mentioned problems.

This objective is achieved according to the present invention by a performance analysis system and method configured for detecting and forecasting system performance degradation according to the object of the independent claims. Dependent claims present further advantages of the invention.

According to the present invention, a machine-learning model is used to simulate a system outcome given a known input. In particular, the present invention proposes a MES oriented deep learning approach for detecting and forecasting system performance from system data analysis as described in the present document. Using a deep learning algorithm for solving the above-mentioned problematic enables the system and the method according to the invention not only to automatically forecast system performance degradation, but also to automatically classify behaviors of the system and to automatically perform system requirement estimations. Per definition, deep learning is "a branch of machine learning based on a set of algorithms that attempt to model high-level abstractions in data elaboration by using a deep graph with multiple processing layers" (as explained for instance at the following link https://en.wikipedia.org/wiki/Deep_learning).

The present invention proposes in particular a method for detecting and forecasting system performance degradation, preferentially at system runtime and in particular in real time. The system for which the performance degradation has to be detected and forecasted will be called hereafter the "M-System" to better differentiate the latter from the performance analysis system, which is the system according to the invention configured for detecting and analyzing the M-System performance. A typical M-System according to the invention, for instance a plant system, may contain a MOM system. In the case we consider, a MOM system contains preferentially a command based Service-Oriented Architecture (SOA) wherein all logics are executed via messages, and wherein an Enterprise Service Bus (ESB) is used for dispatching the logics. Preferentially, the MES according to the invention further interacts with a database in a transactional way.

The present invention concerns therefore a method for detecting and forecasting a performance degradation of an M-System, the method containing the following steps, each performed automatically by a performance analysis system:

a) collecting data regarding the M-System during a period of time P1 by means of the performance analysis system, wherein the collected data comprise at least:
   a1) Command and Event execution metrics of the M-System;
   a2) Platform and Environment configuration information of the M-System;
   a3) ESB information from the M-System,
   a4) Machine Performance Counter data of the M-System;
b) storing the collected data in a database of the performance analysis system;

c) optionally, mapping at least a part of the collected data on Key Performance Indicators (KPIs) and including the obtained KPIs to the collected data;

d) analyzing the collected data collected during the period of time P1 by means of an elaboration routine comprising two distinct elaboration phases:

d1) a first elaboration phase, wherein the performance analysis system selects among the collected data a set of data to be analyzed and removes any noisy data from said set of data;

d2) a second elaboration phase, wherein the performance analysis system correlates, for the set of data, data belonging to different sources, but generated at a same time within the period of time P1 in order to create M-System state data snapshots characterizing the M-System at different times Ti within the period of time P1;

e) generating one or several input datasets from the M-System state data snapshots obtained at different times $T_i$;

f) creating a model for the M-System from the generated input datasets, wherein the model is created by training a predefined machine-learning algorithm by means of the input datasets;

g) starting a runtime phase after the period of time P1, wherein the runtime phase comprises:

g1) collecting the data regarding the M-System by means of the performance analysis system during another period of time called P2 which starts after the period of time P1 in order to generate M-System state data snapshots characterizing the M-System state at different times Tj within the period of time P2;

g2) using the newly generated M-System state data snapshots as input for the created model for automatically predicting a performance degradation of the M-System, and/or for optionally classifying a behavior of the M-System.

The present invention concerns also a performance analysis system for detecting and forecasting a performance degradation of an M-System. The performance analysis system containing:

a) a processing unit configured for being connected to the M-System, wherein the processing unit is configured for automatically collecting data regarding the M-System during a period of time P1, wherein the collected data comprise at least:

a1) Command and Event execution metrics of the M-System;

a2) Platform and environment configuration information of the M-System;

a3) ESB information from the M-System;

a4) Machine Performance Counter data of the M-System;

b) a database for storing the collected data.

The processing unit is further configured for analyzing the collected data collected during the period of time P1 by means of an elaboration routine containing two distinct elaboration phases, respectively:

a) a first elaboration phase, wherein the performance analysis system is configured for selecting among the collected data a set of data to be analyzed and removing any noisy data from said set of data;

b) a second elaboration phase, wherein the performance analysis system is configured for correlating, for the set of data, data belonging to different sources, but generated at a same time within the period of time P1 in order to create M-System state data snapshots characterizing the M-System at different times Ti within the period of time P1.

The processing unit being further configured for automatically generating one or several input datasets from the M-System state data snapshots obtained at different times $T_i$ and for creating a model for the M-System from the generated input datasets. The model is created by training a predefined machine-learning algorithm by means of the input datasets, the predefined machine-learning algorithm being stored in a memory of the performance analysis system.

The processing unit is further configured for starting a runtime phase after the period of time P1, wherein the runtime phase comprises:

a) automatically collecting the data regarding the M-System during another period of time called P2 configured for starting after the period of time P1 in order to generate M-System state data snapshots characterizing the M-System state at different times Tj within the period of time P2; and b) using the newly generated M-System state data snapshots as input for the created model for automatically predicting a performance degradation of the M-System, and/or for optionally classifying a behavior of the M-System.

Other features which are considered as characteristic for the invention are set forth in the appended claims.

Although the invention is illustrated and described herein as embodied in a system and a method for detecting and forecasting the behavior of a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The present invention lays in the technical field of manufacturing execution systems (MES/MOM) used in manufacturing industry for gathering and providing information that helps the manufacturing of products. The manufacturing system, for instance of a plant, and its associated MES or MOM system form together the so-called M-System. The present invention is related to a performance analysis system and method for detecting and forecasting performance degradation of the M-System, in particular of the manufacturing system The method according to the invention is schematically described in FIG. 1. A preferred embodiment of the different steps of a method 100 according to the invention is described in the following.

Figure 1:
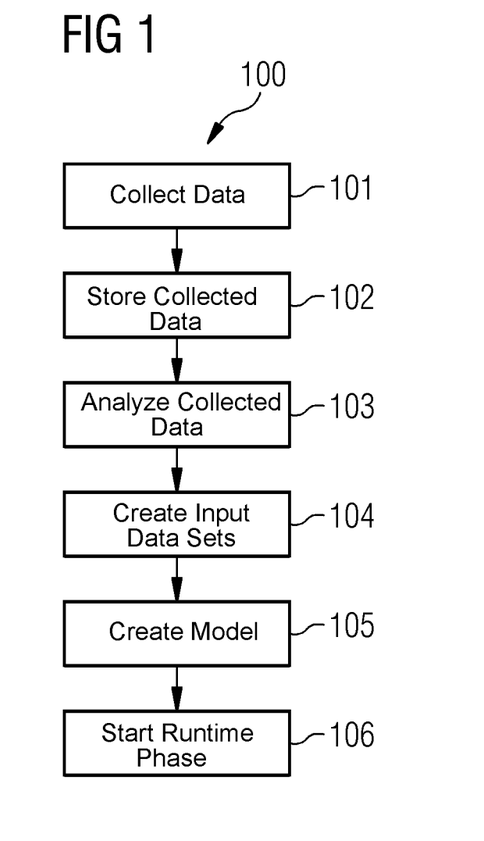
FIG. 1 is a flowchart of a method for detecting and forecasting performance degradation of an M-System.

At step 101, a performance analysis system automatically collects data from the M-System during a period of time P1, wherein the collected data comprise preferentially at least Command and Event execution metrics of the M-System, platform and environment configuration information of the M-System, ESB information from the M-System, and Machine Performance Counter data for the M-System. Command and Event execution metrics typically contain execution times of the logic of messages used by the MOM SOA.

The performance analysis system according to the invention is in particular configured for automatically extracting Command and Event execution metrics from internal M-System traces by using a post-processing logic. Preferentially, the method is configured for detecting a degradation of a performance of the M-System by detecting an increase of Command and Event execution metric values, notably by using a probability distribution analysis of Command and Event execution metric values. Indeed, it has been verified by the Applicant that a degradation of the system behavior is usually correlated to an increase of the metric values, most of the time due to resource saturation.

Preferentially, the method according to the invention is further configured for extracting commit time data on database from a command or an event execution. The commit time data advantageously enable to determine if the M-System is hanging on storing data or if the M-System is not storing at all (i.e. database tables have been locked by the database itself in such a way that no operation can be performed in parallel before the locking ends).

Preferentially, the performance analysis system according to the invention is configured for automatically acquiring the platform and environment configuration information from internal modules of the M-System. Advantageously, the present method is in particular configured for using platform configuration information and environment configuration information for automatically realizing a M-System requirement estimation, i.e. determining the minimum hardware and software configuration for the M-System so that it can run smoothly, i.e, free of any performance degradation. In particular, the method is configured for classifying the different collected data based on the platform and/or environment configuration of the collected data. The environment configuration information consists in both hardware and software information of the M-System, and in particular contains MOM configuration information. It includes for instance, the number of worker processes (also referred to as threads) that can serve in parallel a same request type, or the number of worker processes that are needed.

In particular, the system according to the invention is configured for automatically acquiring ESB from Bus management APIs. The ESB information contains for instance bus statuses for the M-System. In particular, and notably for CQRS based systems, the present invention proposes to use message bus statuses as a main index for determining if the M-System is under stress, in particular, in terms of operation to be computed in parallel.

Preferentially, the performance analysis system according to the invention is configured for automatically extracting Machine Performance Counter data for the M-System, and in particular for its MOM system.

The above-mentioned metrics, data and information that are collected, i.e. gathered, according to the invention form the collected data. At step 102, the collected data are stored in a database. Advantageously, and in particular when considering a MES terminology, the method and system according to the invention are configured for mapping at least a part, preferentially all, the collected data on KPIs which are then used according to the present invention to find out relationships between different KPIs and/or informatics quantities. The mapping refers to a logical map in order to create a logical contextualization of the informatics quantities, the latter comprising typically performance counters, execution times, and message queue information.

A typical example of a KPI according to the invention is the average command execution time that might be found from Command execution metrics and which specifies how long a certain operation is processed. Preferentially, the average command execution time is restricted according to the present invention to automatic processes. Indeed, according to the present invention, manual operations are not taken into account since they would add a static noise difficult to be removed. At the opposite, average command execution time for automatic processes like automatic assembly of a product will match almost exactly the real production operation time.

After the mapping of at least a part of the collected data on KPIs, the method is further configured for finding relationship between KPIs and informatics quantities, preferentially between MES KPIs and the informatics quantities.

For instance, a process usage can be one of the collected data according to the invention. In that case, a low process usage within the M-System is interpreted by the method according to the invention as a problem in a business logic execution. From an MES point of view, one usually speaks of ideal production rate and actual production rate wherein an Overall Equipment Effectiveness (OEE) KPI is the ratio between the two of them. A logic deduction, confirmed by the results, is that the low process usage is symptomatic of a low business logic execution request and so a lower production rate. Moreover, the low production rate can be symptomatic of a decrease of another data collected according to the present invention, or a variable determined from the collected data, and that is taken into account for analyzing the collected data. The other data or variable according to the invention can be an ESB message rate and message counts. In that case, the method is preferentially configured for signaling a slowing down of a business logic (which may occur for instance from a bug in the business logic, or a problem in the transactional database, and so on) from a reduction of messages in the ESB with respect to an average number of them in queue, All the collected data are extracted by the performance analysis system according to the invention, for instance gathered by a service, and preferentially stored in the database, for instance inside a Non-Relational (NoSQL) database. Advantageously, the NoSQL database is better adapted to the nature of the collected data compared to a relational database, since there is almost no relation between the collected data, and additionally, the NoSQL database provides also an average higher performance in handling large block of data. If KPIs have been generated from the collected data, then said KPIs are included within the collected data for further analysis by the performance analysis system. In other words, in that case, the collected data comprise also the KPIs.

Figure 2:
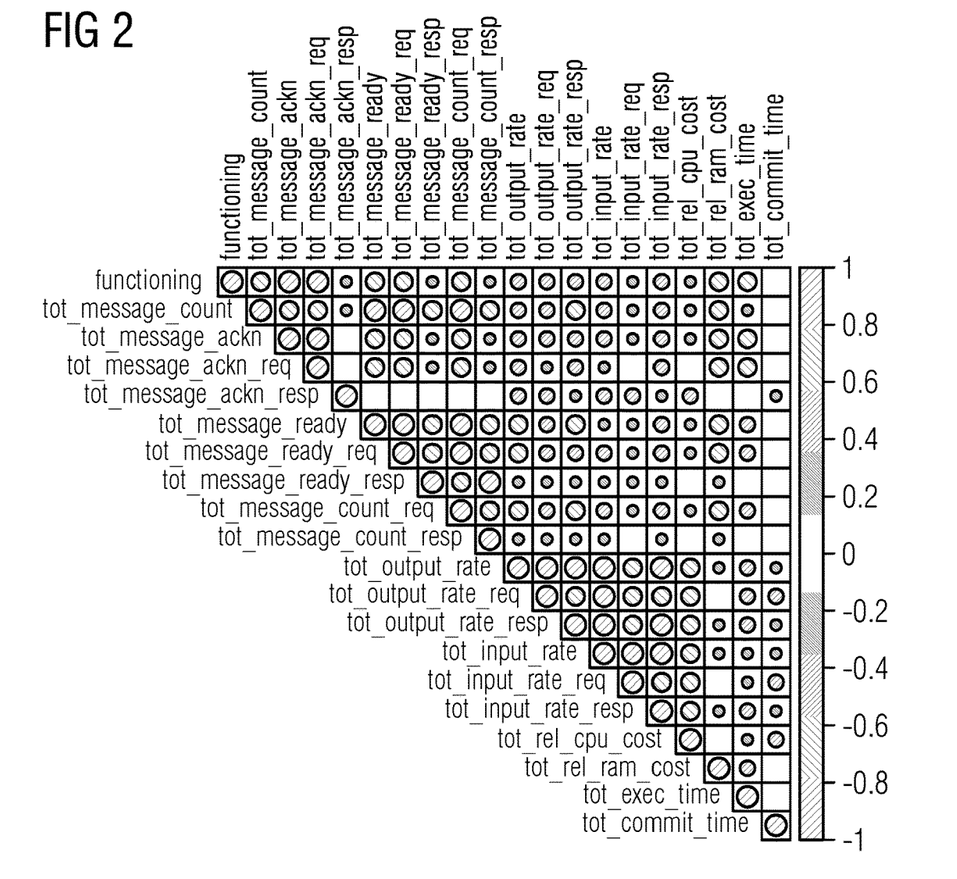
FIG. 2 is an illustration of an example of a correlation matrix between different data sources for the M-System.

At step 103, the method is then further configured for analyzing the collected data by means of an elaboration routine containing two distinct elaboration phases:

a) a first elaboration phase, wherein the system according to the invention selects among the collected data a set of data to be analyzed and preferentially removes any noisy data from said set of data. By "noisy data" it is referred to any data that may comprise misleading information that potentially might generate confusion within the claimed system when analyzed. For instance, noisy data are detected by analyzing a standard deviation of the collected data with respect to the mean;

b) a second elaboration phase, wherein the system according to the invention is configured for correlating, within the set of data, data belonging to different sources of data, but generated at the same time. The different sources of data are for instance command and event execution data, and/or command and event commit time data, and/or message queue information data, and/or performance counter data, and/or MES KPI data, and/or ©EE counter data. The second phase can be seen as an aggregation phase, as shown in FIG. 2, which represents a correlation matrix between different sources of collected data. The color of the circles indicates the correlation between the sources of collected data, wherein dark circles indicate a strong correlation while light grey circles indicate a weak correlation. Advantageously, the correlation enables the system according to the invention to obtain an M-System state snapshot from the collected data, preferentially from all collected data apart from the removed noisy data, at a specific time Ti within the period of time P1. In particular, different M-System state snapshots are determined by the system at different specific times Ti, for instance at time T1, T2, . . . , Tn, and are then used by the system according to the invention as input datasets for a training phase. By snapshot it has to be understood a view of M-System state data at said specific time Ti.

It should be noted that the performance analysis system according to the invention is in particular configured for realizing the first elaboration phase on a real scenario (i.e. while connected to the M-System, e.g. in a plant), while the second elaboration phase can be realized remotely from the M-System and free of any connection with the latter, since no runtime information is required for said second elaboration phase. Moreover, once it has been obtained, the output of the elaboration routine, i.e. the input datasets, can be stored in the database and used when needed, with no need of re-computing it.

Figure 3:
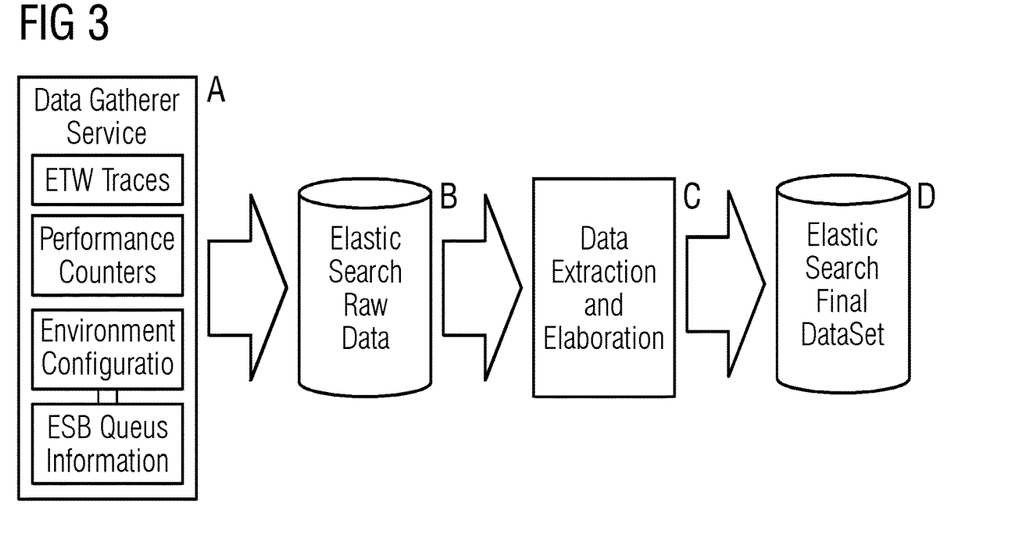
FIG. 3 is an illustration of an example of the analysis of data gathered from the M-System.

FIG. 3 recaps the gathering, extraction and elaboration process. In particular, the system according to the invention is configured for using a search engine such as the ElasticSearch for extracting the set of data to be analyzed from the collected data. For instance, from a data gatherer service A of the performance analysis system according to the invention, the raw data are gathered and saved as collected data on an elastic search database B. Querying the ElasticSearch database B, the collected data are retrieved and organized in order to be ready for implementing the elaboration routine C. Once the elaboration routine is finished, the obtained outputs are the so-called input datasets which might be saved in an Elastic Search database D and ready for use for the training phase at step 105 or as source for dashboards.

Figure 4:
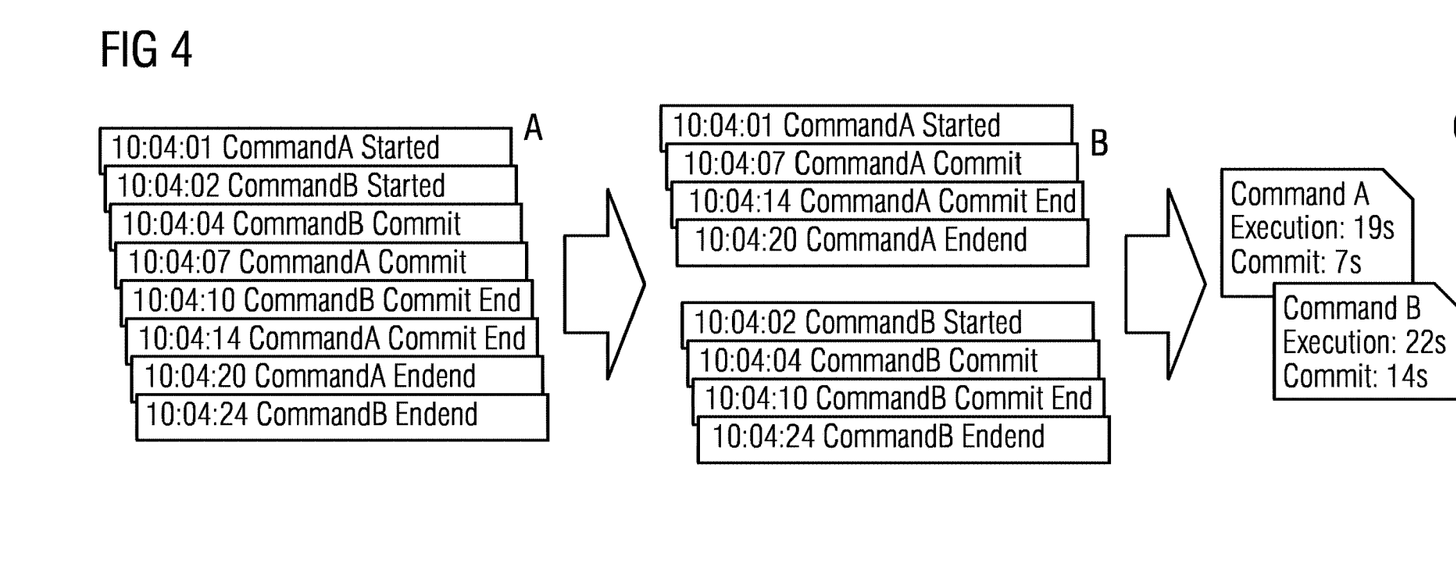
FIG. 4 is an illustration of an example of information extraction from data gathered from the M-System.

Preferentially, the system according to the invention uses a pattern recognition algorithm performed on each trace message for extrapolating Command and Event execution metrics. Indeed, typical MOM systems do not provide information about precise command execution or commit time, but only a low-level trace of all operations performed. The pattern recognition algorithm, as shown in FIG. 4, enables for instance to determine a command execution and commit time from collected trace messages by grouping the collected data by command and/or event, and temporally ordering the grouped data from the trace messages, wherein for each command and/or event type, an execution time and commit time are automatically determined by the system and preferentially stored in the database for further analysis. According to FIG. 4, the data are first read and gathered A from the trace sources, e.g. Windows ETW sources. Then the collected data are grouped B by command (or event) ID and ordered by time. Finally, for each command ID the execution time and commit time are extracted C. The data produced are stored back again and are ready to be used.

Regarding the Machine Performance Counter data, the system according to the invention is not only configured for collecting all the information of MOM processes, but also and preferentially information of all backend processes, such as SQL Server processes, and/or Internet Information Services (IIS) processes, and/or ESB processes.

Regarding the collected ESB information, the system according to the invention is in particular configured for clustering the collected ESB information regarding states of different queues in meaningful and generic sets of data, for instance the system is according for automatically determining a first cluster related to an overall performance of all command request queues, wherein a Command lifecycle is divided in a Request phase and a Response phase, and/or a second cluster related to a queuing of all the events, i.e. how all events queue. Indeed, knowing for instance that the M-System is producing more requests than responses means that it has encountered a stall or a lock in the business logic.

At step 104, the collected data, in particular the created snapshots obtained at different times $T_i$, are used for creating input datasets.

At step 105, once a complete input dataset is obtained, the system according to the invention automatically produces or creates a model from the input datasets, wherein the model is configured for enabling a classification and/or a prediction of a performance of the M-System. By "complete" input dataset, it has to be understood that the input dataset is considered as complete once it contains all data required for creating the model. According to machine learning terminology, the concept of "model" defines an object that is able to perform the classification or prediction of activities, in the present case, of activities of the M-System. A model is in particular a customization of a machine-learning algorithm, wherein said customization depends on the input dataset obtained according to the present invention. An analogy might be made with the following simplistic example: a neural network is an algorithm and the weight of each node enables a customization of the algorithm and thus the construction/production of a specific model for said neural network. Usually, the "customization" of the algorithm is called "training" phase in the machine learning terminology. According to the present invention, the input datasets are used for training a predefined algorithm in order to classify and/or predict a performance of the M-System. In the present document, the training phase related to the creation of a model will not be tackled, since it is a well-known task for the skilled man. Like the second elaboration phase, the training phase does not require to be performed on the site of the M-System (i.e. it can be performed remotely, free of any connection with the M-System). Further, the output of the training phase can be used on a large variety of different scenarios for the M-System. Preferentially, the system according to the invention is configured for refining the model via an additional and successive learning phase even during production: in this case, the model can better fit on the real scenario.

At step 106, after having produced the model, the system according to the invention automatically starts a runtime phase, wherein Command and Event execution metrics, platform and environment configuration information, Enterprise System Bus (ESB) information, and Machine Performance Counter data are automatically collected by the performance analysis system during a period of time P2 that starts chronologically after the period of time P1. In other words, like for the training phase, the same kind of data are collected from the M-System for being extracted and elaborated in order to obtain the same dataset input format as used for the learning phase. With the dataset inputs obtained during the runtime phase, i.e. during the period of time P2, the system according to the invention is configured to use the previously produced model for automatically predicting a performance degradation of the M-System, and/or for optionally classifying a behavior of the M-System.

Preferentially, the performance analysis system according to the invention may perform different tasks for analyzing the performance of the M-System by using the collected data during the runtime phase as input to the model and analyzing the resulting output of said model. For instance:

a) it can be configured for automatically classifying the performance behavior of the M-System. In this case, the model is in particular trained during the training phase for recognizing different performance statuses of the M-System. Such a model is in particular called a "classification model". From the input datasets collected at runtime (i.e. during the runtime phase), the system according to the invention automatically determines a performance status (for instance a general system behavior) for the M-System. The statuses can be very generic, like "Bad" performance and "Good" performance, or more specialized like "Under Performing", "Good Performance", "Low resource available", etc., depending on the needs; and/or b) it can be configured to automatically perform a Performance Degradation Forecast. In that case, the model is in particular trained by the system according to the invention in order to predict a future performance status of the M-System. The system uses in particular both a classification and a prediction approach: first, an evolution of at least one, preferentially all data sources, is predicted from the collected data, in particular from the previously collected data, for instance from the data collected during the period of time P1, in particular by using a regression analysis, then the system determines predicted output data for each data source whose evolution has been predicted, and uses the predicted output data in order to create a predicted input dataset for the model. The result of inputting the predicted input dataset to the model is used for classifying a hypothetical future performance state of the M-System; and/or c) it can be configured to automatically perform an M-System Requirement Estimation. In that case, the model is trained with collected data from different hardware configurations of the M-System in order to perform the above-mentioned classification of the performance of the M-System with regard to the different hardware configurations. The basic idea is to automatically determine by means of the system according to the invention a minimum hardware configuration allowing a specific working of the M-System to run smoothly. In order to do so, after having trained the model, an artificial data that simulates said specific working is given to the model as input. The artificial data is preferentially simulated automatically by a simulation routine of the system according to the invention. From the model output, the system according to the invention automatically determines the minimum affordable hardware requirement for the M-System.

For the automatic classification of the performance behavior, the system according to the invention might be configured for providing the resulting classification as a dashboard output (in particular when the output of the model is a "good\bad" classification) and/or using the resulting classification for an automatic recovery procedure. In the latter case, the system according to the invention comprises in particular at least one set of statuses, i.e. different kind of warnings, configured for forecasting a future performance state of the M-System. The dashboard can be useful for giving a general idea of the M-System state to a non-expert user.

Advantageously, the Performance Degradation Forecast is an automatic procedure capable of correcting long-term and medium-term prediction. Finally, an advantage of the Requirement Estimation is to automatically provide as output some requirements for the M-System, the output being for instance then used by a sale man for determining an appropriate M-System for a customer and finalizing an offer.

Figure 5:
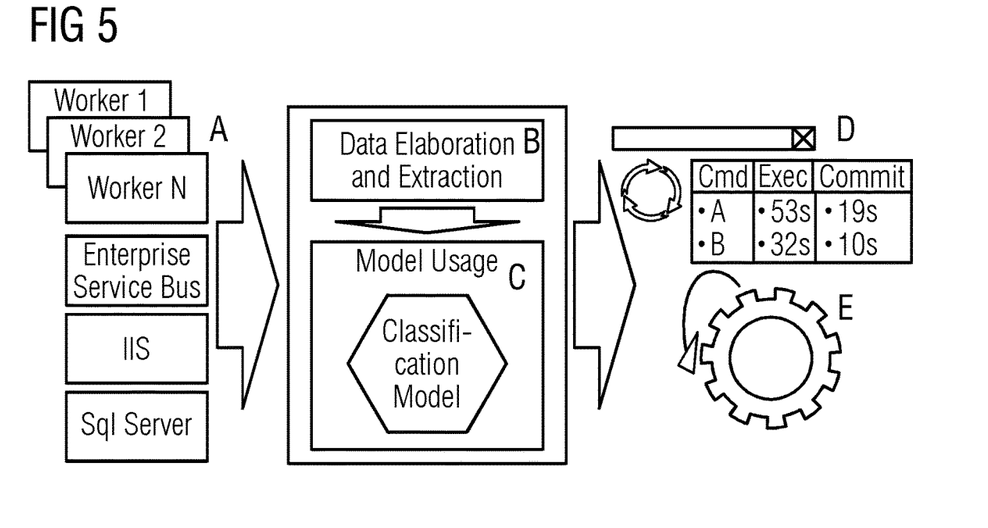
FIG. 5 is an illustration of an example of a runtime process for classifying performance of the M-System.

FIG. 5 illustrates the runtime phase for a classification of the performance behavior of the M-System according to the present invention. First, data are collected A from the M-System environment which notably contains MOM processes and backend. Then, the collected data are extracted and elaborated B in order to create dataset inputs for the model. Then the elaborated information, i.e. the generated dataset inputs, is passed C as input for the model, which is in this particular case trained for classification. Finally, the model output is used in a dashboard D or as the input for the runtime phase as an automatic procedure E for analyzing performance degradation of the M-System.

Figure 6:
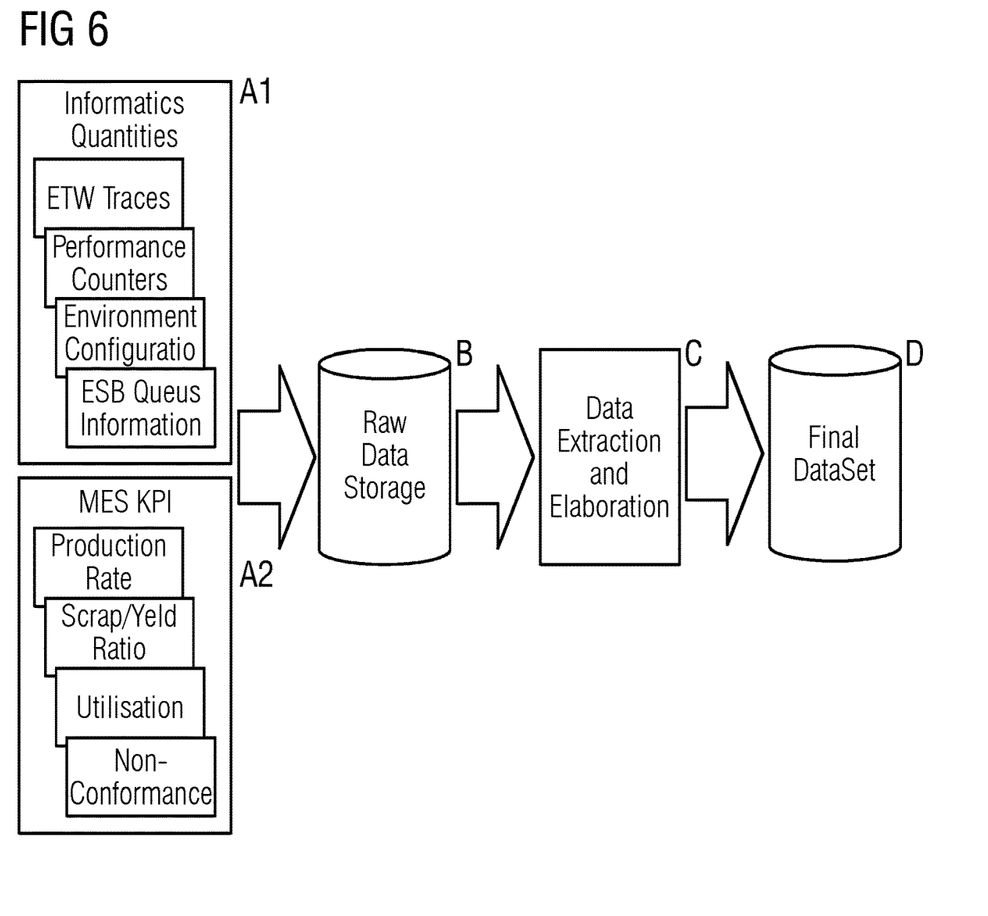
FIG. 6 is an illustration of an example of information extraction from data gathered from the M-System, wherein KPIs are taken into consideration.

As already mentioned, alternatively or optionally, the system according to the invention may use, only or together with the collected data, KPIs as dataset input for the model. FIG. 6 shows how FIG. 3 would be modified in accordance with the adding of this new KPI data into the model. According to this alternative or optional embodiment, the collected data additionally contains KPIs. The KPIs, like the previously mentioned collected data, are handled by the system according to the invention as data time series (DTS) that have to be elaborated into dataset inputs that will be used as inputs for the model. Typically, the KPIs might be produced or provided by various applications of a MES, like the OEE or the MI. From a MOM point of view, not considering the MES itself, it can be provided by a Quality application or a Process Scheduler application.

To summarize, the proposed invention provides the now described advantages compared to existing techniques.

The training model uses both system and platform specific information, but remains generic enough for being reused in different MES scenarios. Moreover, since the model might be refined through successive trainings, it is easily customizable for a specific M-System without losing genericity. The key aspect with respect to the state of art is that the collected data are free of application specific information: compared to prior art techniques, it enables to train the same model for different M-Systems.

Thanks to the deep learning algorithm, informatics data, i.e. the collected data, are correlated together and optionally put in relationship with typical MES KPI in order to have a better fit on real MES problems as well as increase the detail of the M-System representation.

The method does not require to be trained on a customer M-System, which is an advantage for instance if a nondisclosure agreement has not been signed with the customer, since production data do not require to be shared for the training.

The method might be applied for a classification of the performance of the M-System as well as for prediction of M-System requirements and degradation forecast in relation to M-System performance. According to the present invention, the M-System requirement is simply obtained by changing input parameters in order to evaluation M-System performances in function of the input parameters, without building a simulator of the M-System, since the estimation of the requirement is not based on particular application-specific configuration and know-how.

According to the described method, the analysis of the collected data enables to extract information also useable in different area, such as for display on dashboard, providing therefore additional M-System information to a customer. Moreover, thanks to the prediction phase via regression, the system according to the invention might be configured for showing how different collected data are going to evolve in function of time, giving therefore not only a simple Business Intelligence interface, but a projection in the future.

The system and method according to the invention may further comprise an automatic procedure for preventing a stall or failure of the M-System, for instance by automatically enabling a solving of some problems or by sending a warning to an operator if the problem is not automatically solvable, reducing therefore the M-System downtime.

Finally, having a separate training phase and runtime phase enable the system according to the invention to react very quickly to a degradation of the performance of the M-System since the heavier part of data handling (from a computational point of view) is performed during the training phase.

The invention claimed is:

1. A method for detecting and forecasting a performance degradation of a system, called hereafter "M-System", the method comprising the following steps, each performed by a performance analysis system:
    a) collecting data regarding the M-System during a period of e P1 by means of the performance analysis system;
    b) storing collected data in a database of the performance analysis system;
    c) analyzing the collected data collected during the period of time P1 by means of an elaboration routine containing two distinct elaboration phases:
        c1) performing a first elaboration phase, wherein the performance analysis system selects among the collected data a set of data to be analyzed and removes any noisy data from the set of data;
        c2) performing a second elaboration phase, wherein the performance analysis system correlates, for the set of data, data belonging to different sources, but generated at a same time within the period of time P1 in order to create M-System state data snapshots characterizing the M-System at different times Ti within the period of time P1;
    d) generating an input dataset from the M-System state data snapshots obtained at different times $T_i$;
    e) creating a model for the M-System from generated input datasets, wherein the model is created by training a predefined machine-learning algorithm by means of the input datasets; and
    f) starting a runtime phase after the period of time P1, wherein the runtime phase comprises:
        f1) collecting further data regarding the M-System by means of the performance analysis system during another period of time called P2 which starts after the period of time P1 in order to generate further M-System state data snapshots characterizing the M-System state at different times Tj within the period of time P2; and
        f2) using the further M-System state data snap-shots as inputs for the model for automatically predicting the performance degradation of the M-System.

2. The method according to claim 1, wherein the collected data contains:
    Command and Event execution metrics of the M-System platform and Environment configuration information of the M-System;
    Enterprise Service Bus (ESB) information from the M-System; and
    Machine Performance Counter data of the M-System.

3. The method according to claim 1, which further comprises mapping at least a part of the collected data on Key Performance Indicators (KPIs) and including obtained KPIs to the collected data for analysis.

4. The method according to claim 1, which further comprises:
    automatically predicting the performance degradation of the M-System by automatically classifying a performance behavior of the M-System by using performance statuses; and/or
    automatically performing a Performance Degradation Forecast; and/or
    automatically performing an M-System requirement estimation.

5. The method according to claim 4, which further comprises:
    obtaining the Performance Degradation Forecast by using previously collected data for predicting an evolution of an M-System data source output;
    determining a predicted output data for the data source for which an evolution has been predicted;
    using the predicted output data to create a predicted input dataset; and
    inputting the predicted input dataset to the model in order to output a predicted result.

6. The method according to claim 4, which further comprises automatically training the model with the collected data belonging to different hardware configurations of the M-System in order to perform a classification of performances of the M-System in dependence on the different hardware configurations and perform automatically an estimation of M-System requirements.

7. The method according to claim 1, which further comprises automatically extracting Command and Event execution metrics from internal M-System traces by using a post-processing logic.

8. The method according to claim 1, which further comprises detecting a degradation of a performance of the M-System by detecting an increase of Command and Event execution metric values.

9. The method according to claim 1, which further comprises using a pattern recognition algorithm performed on each trace message for extrapolating Command and Event execution metrics.

10. A performance analysis system for detecting and forecasting a performance degradation of an M-System, the performance analysis system comprising:

a memory;

a processing unit configured for being connected to the M-System, said processing unit configured for automatically collecting data regarding the M-System during a period of time P1;

a database for storing collected data;

said processing unit further configured for analyzing the collected data collected during the period of time P1 by means of an elaboration routine having two distinct elaboration phases, respectively:

a first elaboration phase, wherein the performance analysis system is configured for selecting among the collected data a set of data to be analyzed and removing any noisy data from the set of data;

a second elaboration phase, wherein the performance analysis system is configured for correlating, for the set of data, data belonging to different sources, but generated at a same time within the period of time P1 in order to create M-System state data snapshots characterizing the M-System at different times $T_i$ within the period of time P1;

said processing unit being further configured for automatically generating input datasets from the M-System state data snapshots obtained at different times $T_i$ and for creating a model for the M-System from the input datasets, wherein said model is created by training a predefined machine-learning algorithm by means of the input datasets, the predefined machine-learning algorithm being stored in said memory of the performance analysis system;

said processing unit is further configured for starting a runtime phase after the period of time P1, wherein the runtime phase comprises:

automatically collecting the data regarding the M-System during another period of time called P2 configured for starting after the period of time P1 in order to generate further M-System state data snapshots characterizing the M-System state at different times $T_j$ within the period of time P2; and     using the further M-System state data snapshots as an input for the model for automatically predicting the performance degradation of the M-System, and/or for optionally classifying a behavior of the M-System.

11. The performance analysis system according to claim 10, wherein the collected data comprises:

Command and Event execution metrics of the M-System;

Platform and Environment configuration information of the M-System;

Enterprise Service Bus (ESB) information from the M-System; and

Machine Performance Counter data of the M-System.

* * * * *